Patented June 17, 1952

2,600,783

UNITED STATES PATENT OFFICE 2,600,783

COPOLYMERS OF DIMETHYLSTYRENES AND VINYL ACYCLIC COMPOUNDS

Edward L. Kropa, Old Greenwich, Conn., assignor to American Cyanamid Company, New York, N. Y., a corporation of Maine No Drawing. Application July 20, 1948, Serial No. 39,827

9 Claims. (Cl. 260—85.5)

This invention relates to fusible copolymers of dimethylstyrenes in which the methyl groups are nuclear substituents, and to the production of such copolymers.

An object of the present invention is to provide thermoplastic materials having a relatively high heat distortion as compared to polystyrene and similar thermoplastics previously available.

Another object of my present invention is to provide polymeric thermoplastic materials which mold easily, particularly by extrusion, injection or blow molding.

Still another object of the present invention is to provide a thermoplastic having the desirable properties of polystyrene but having a sufficiently high softening point to be resistant to water which is heated to temperatures of about 90°–100° C.

A further object of my invention is to provide a plastic which is of sufficient purity that molded articles produced therefrom have relatively high strength and do not craze during the life of the molded article.

A still further object of this invention is to provide a pastic having a relatively low density.

One other object of the present invention is to provide copolymerizable compositions which polymerize more rapidly than similar compositions containing styrene in place of dimethylstyrenes.

Another object of my invention is to prepare copolymers which have a high degree of flexibility and yet which are sufficiently hard that they may be used in coating compositions to form durable finishes on a wide variety of materials, including leather, textiles, paper, asbestos, etc.

The above and other objects may be attained by copolymerizing a dimethylstyrene in which the methyl groups are nuclear substituents, i. e., 2,4-dimethylstyrene, 2,5-dimethylstyrene, and 3,4-dimethylstyrene, with a polymerizable acyclic compound containing a single ethylenic double bond.

The following examples in which the proportions are given in parts by weight are for purposes of illustration. The invention is not to be construed as limited to the details therein set forth.

EXAMPLE 1

1 part of 2,5-dimethylstyrene and 1 part of acrylonitrile are copolymerized by heating for 6–7 days in the absence of air and catalyst. The resulting polymer has a slight colloidal haze and possesses a pale yellow color. The product has a high heat distortion, and the dimethylstyrene is more compatible and copolymerizes with the acrylonitrile more readily than styrene. The Barcol hardness of a molded part of this copolymer is 28 (maximum).

EXAMPLE 2

Example 1 is repeated substituting 2,4-dimethylstyrene for the 2,5-dimethylstyrene. A similar product was formed having a Barcol hardness of 37 (maximum).

EXAMPLE 3

Example 1 is repeated substituting 3,4-dimethylstyrene for the 2,5-dimethylstyrene and similar products are obtained. A molded article of the copolymer of this example has a Barcol hardness of 35 (maximum).

EXAMPLE 4

Equal weights of various dimethylstyrenes are copolymerized with ethyl fumarate. For control purposes, unsubstituted styrene is also used. 2,4-dimethylstyrene copolymerizes most rapidly with ethyl fumarate, 2,5-dimethylstyrene is somewhat slower, and 3,4-dimethylstyrene is the slowest. All of the substituted styrenes copolymerize much more rapidly than does unsubstituted styrene. The time to set on each copolymer is noted in the table following. This time is a measure of the copolymerization rate, and the viscosity of the copolymer at the time of set is such that at the temperature of copolymerization no flow occurs.

| Copolymer | Time to set at 100° C. | Barcol Hardness |
|---|---|---|
| 1 part of ethyl fumarate and 1 part of 2,4-dimethylstyrene. | within 5 hours | 15 |
| 1 part of ethyl fumarate and 1 part of 2,5-dimethylstyrene. | within 10 hours | 12 |
| 1 part of ethyl fumarate and 1 part of 3,4-dimethylstyrene. | within 24 hours | 10 |
| 1 part of ethyl fumarate and 1 part of styrene. | greater than 48 hours. | less than 1 |

After 144 hours at 100° C., the copolymers from the dimethylstyrenes are clear and colorless, whereas the copolymer of styrene and ethyl fumarate is hazy.

EXAMPLE 5

50 parts of isopropyl methacrylate and 50 parts of 2,4-dimethylstyrene are heated in the absence of air and catalyst for 4 days at 65° C., for 2 days at 100° C., and for 1 day at 130° C. A water white resin having an impact strength (ski ball) of 0.17, a flexural strength of 6900 and a Peake's flow of 120° C. is obtained.

Comparative Example 1

132 parts of 2,6-dimethylstyrene is mixed with 98 parts of maleic anhydride and the mixture heated in an oil bath with the following results:

| Time | Bath Temp. °C. | Temp. of Mixture, °C. | Appearance |
|---|---|---|---|
| | 90 | 80 | anhydride undissolved. |
| | 115 | 95 | anhydride undissolved. |
| 15 mins | 112 | 103 | partially dissolved. |
| | 115 | 103 | all dissolved. |
| | 110 | 108 | all dissolved. |
| 10 mins | 140 | 133 | all dissolved. |
| | 150 | 140 | all dissolved. |
| 25 mins | 163 | 155 | all dissolved. |
| 2 hrs | 173 | 165 | slight darkening. |
| | 173 | 165 | dark brown (no viscosity increase). |

After standing, the dark color settles to the bottom of the reaction vessel, this lower layer comprising about ⅓ of the total volume. This oily material is soluble in dioxane and acetone, and insoluble in ethylene dichloride, benzene, and methanol. The copolymer of styrene and maleic anhydride, on the other hand, copolymerizes instantaneously and violently under similar operating conditions. Moreover, the viscosity increase is large when compared with the 2,6-methylstyrene.

Comparative Example 2

66 parts of 2,6-dimethylstyrene is mixed with 27 parts of acrylonitrile in a suitable vessel which is sealed under an atmosphere of carbon dioxide. The vessel is placed in an oven at 84° C. and after 2 days a slight darkening of color unaccompanied by any viscosity increase is noted. The temperature is raised to 100° C. and after 2 more days a slight milkiness begins to appear. After 3 more days some oily polymer settles to the bottom of the vessel. A trace of benzoyl peroxide is added and the 100° C. temperature maintained for about 20 hours. This treatment results only in a precipitation of a larger amount of the solid and the supernatent liquid is not at all viscous. Since polyacrylonitrile is insoluble in 2,6-dimethylstyrene, it is probable that only the acrylonitrile polymerizes.

It will be seen from the results of the two comparative experiments that a useful soluble solid thermoplastic copolymer of 2,6-dimethylstyrene with an acyclic compound containing a single ethylenic double bond cannot be prepared. This is not entirely surprising in view of the inability of 2,6-dimethylstyrene to itself polymerize as disclosed in the copending application of Murray G. Sturrock and Thomas Lawe, Serial No. 48,938, filed September 11, 1948, now U. S. Patent 2,555,298.

Among the acyclic compounds containing a single ethylenic double bond which may be copolymerized with the dimethylstyrenes in accordance with my invention are included acrylonitrile, methacrylonitrile, maleic nitrile, fumaric nitrile, alkyl esters of acrylic acid such as methyl acrylate, ethyl acrylate, butyl acrylate, etc.; acrylic acid, alkyl esters of methacrylic acid such as methyl methacrylate, ethyl methacrylate, etc.; methacrylic acid, acrylamide, methacrylamide, acrolein, vinyl chloride, vinylidene chloride, maleic acid or anhydride, maleic imide, acid esters of maleic acid such as monomethyl acid maleate, monoethyl acid maleate, monobutyl acid maleate, etc.; dialkyl esters of maleic acid, fumaric acid, itaconic acid, and other alpha, beta-unsaturated polycarboxylic acids such as, for example, dimethyl maleate, diethyl maleate, diethyl fumarate, dibutyl fumarate, dimethyl itaconate, dibutyl itaconate, etc., and the like.

The present invention covers copolymers of 2,4-dimethylstyrene, 2,5-dimethylstyrene, and 3,4-dimethylstyrene. In order that the objects of the invention be attained, it is preferable that these dimethylstyrenes be substantially pure. I have found that they should melt within a range of no more than about 3° C. and have an optical exaltation of at least one. Dimethylstyrenes having this high degree of purity may be prepared in accordance with the Murray G. Sturrock and Thomas Lawe U. S. Patent No. 2,420,689, issued May 20, 1947.

The properties of the dimethylstyrene copolymers of the present invention, such as heat distortion and plasticity, may be varied over very wide ranges by variation in the ingredients of the copolymers and in the proportions thereof. In general, the copolymers may contain from 2 to 10 copolymerizable materials. In other words, each copolymerizable material must be present in an amount equivalent to at least 10% by weight of the total copolymerizable material. Thus, the proportion of any one copolymerizable material may be varied between 10% and 90% by weight of the total polymerizable composition.

Copolymerization of the dimethylstyrenes according to the present invention may be carried out at any temperature which gives the desired rate of reaction and at the same time the desired type of copolymer. Thus, the temperature may be varied over wide ranges such as, for example, from 20° C. (about 20° C.) up to 200° C. (about 200° C.). In order to obtain rapid copolymerization of the dimethylstyrenes in emulsions or dispersions in water, the reaction temperature is preferably maintained at 30°–100° C. (about 30° to about 100° C.). However, the reaction temperature may desirably be higher when only high boiling substances are being copolymerized than when the copolymerizable composition contains some relatively volatile substances. When products which are low boiling or gaseous at room temperature are being copolymerized with one or more dimethylstyrenes, the temperature is preferably maintained below 60° C. (about 60° C.). When dimethylstyrenes are copolymerized in bulk, the temperature is preferably 90°–130° C. (about 90°–130° C.).

If one or more of the substances being copolymerized with a dimethylstyrene is highly volatile at the temperature of the polymerization, the reaction may be carried out under pressure to avoid loss of the volatile material.

In order to increase the rate of copolymerization of the dimethylstyrenes, a small proportion, e. g., 0.01–5% of a polymerization catalyst such as the organic peroxides and hydrogen peroxides or ozonides, may be used. Hydrogen peroxide may be incorporated in the aqueous phase of emulsions of the copolymerizable materials or in aqueous dispersions thereof, and other water-soluble polymerization catalysts which may be employed are the persulfates such as potassium persulfate, percarbonates, perborates, etc. Organic peroxides may be incorporated in the copolymerizable compositions, and examples of such substances are benzoyl acetic peroxide, acetic peroxide, benzoyl peroxide, lauric peroxide, oleic peroxide, stearic peroxide, tertiary butyl hydroperoxide, etc.

Polymerization promoters such as nitrogen compounds, i. e., melamine, monohydric and polyhydric phenols, i. e., pyrogallol, hydroquinone, phenol, may be used in conjunction with the polymerization catalyst if desired as described in my copending applications, Serial Nos. 763,763–5 filed July 25, 1947 now U. S. Patents 2,562,327–9 respectively.

In order to obtain light colored products, it is preferable that the reaction be carried out in the absence of a polymerization catalyst and in the absence of air. Under certain conditions ultraviolet light may be used, and ozone may also be utilized to promote copolymerization.

The dimethylstyrenes may be copolymerized with one or more polymerizable acyclic compounds containing a single ethylenic double bond either in bulk or in the form of aqueous dispersions or emulsions. Suitable dispersing agents include talc, calcium phosphate, styrene-maleic acid heteropolymers, dimethylstyrene-maleic acid heteropolymers, methyl cellulose, polyvinyl alcohol, methyl starch, glycol cellulose, polyacrylamide, etc.

When the dimethylstyrenes are copolymerized in emulsions, either anionic or cationic emulsifiers may be used including, for example, sodium hydroxystearate, the sodium salts of long chain sulfated alcohols (such as sodium lauryl sulfate), the sodium salts of organic sulfonates including the sodium salts of alkyl substituted naphthalene sulfonic acids, the sodium salts of the alkyl esters of sulfosuccinic acid such as the sodium salt of the dioctyl ester of sulfosuccinic acid, dodecylamine hydrochloride, dodecylamine formate, quaternary ammonium compounds such as trimethyl benzyl ammonium chloride, etc. Mixtures of the various emulsifying agents may be employed, and it has been found that mixtures including a sodium salt of an alkyl ester of sulfosuccinic acid such as the one mentioned above with the sodium salt of an alkyl naphthalene sulfonic acid is especially suitable.

The copolymerization of dimethylstyrenes in aqueous dispersions results in a relatively slow polymerization to give a copolymer which precipitates during the reaction, whereas copolymerization of the dimethylstyrenes in emulsion form results in a more rapid copolymerization and a copolymer of somewhat higher molecular weight. Furthermore, the copolymer obtained by emulsion polymerization generally remains dispersed and may be used in the form of a dispersion or coagulated to obtain the solid polymers.

The polymerization may be carried out by continuous methods.

It has been stated that the dimethylstyrenes being copolymerized are preferably substantially pure. In order to maintain the necessary degree of purity after preparation of the monomer in accordance with the Sturrock and Lawe patent mentioned above or by any other process, the dimethylstyrenes must be stabilized to prevent polymerization during storage. For this purpose small proportions of polymerization inhibitor such as hydroquinone are incorporated in the dimethylstyrenes. Prior to polymerization this polymerization inhibitor is preferably removed either chemically or physically. For example, I have found that the inhibitor may be effectively removed by means of an adsorbent such as, for example, silica gel. If the polymerization inhibitor be permitted to remain in the dimethylstyrene, sufficiently large proportions of polymerization catalyst should be used in order to cause the polymerization reaction to proceed. Alternatively, polymerization retarders which decompose upon heating may be used to stabilize the dimethylstyrenes during storage, and a dimethylstyrene containing these substances may be polymerized without a preliminary purification step.

My invention relates broadly to copolymers of dimethylstyrenes and acyclic compounds containing a single ethylenic double bond which are of relatively high molecular weight. They are normally solid, they are fusible and soluble, and they have a minimum intrinsic viscosity of about 0.1. By "soluble" is meant solubility in styrene solvents such as benzene, toluene, xylene, and other aromatic hydrocarbons as well as their chlorinated derivatives such as chlorobenzene, etc., halogenated aliphatic hydrocarbons such as ethylene dichloride, etc., ketones such as methyl ethyl ketone, etc., esters such as butyl acetate, etc., and the like.

The aqueous emulsions of polymers or solutions of copolymers of the dimethylstyrenes dissolved in organic liquids may be used in the treatment of fibrous materials including paper, textiles, leather, etc. The polymer may be applied in the form of a coating and subsequently calendered to give a smooth water resistant finish, or the materials may be impregnated, for example, in order to increase their resistance to the passage of vapors and moisture therethrough.

Copolymers produced in accordance with my invention may be formed into sheets or fibers by extrusion and, if desired, drawn to form products having high tensile strength.

While my copolymeric materials are especially suitable for use in the production of molded articles which are clear and substantially transparent, they may have dyes, pigments, or filler incorporated therein if desired. It is an advantage of my invention that its copolymers may be milled for color incorporation and still retain properties equal to those of polystyrene. My copolymers may be employed in coating compositions, including paints, lacquers, enamels, and varnishes, etc. In such cases various other resins and plasticizers may be incorporated in the compositions.

Obviously, many modifications and variations in the processes and compositions described above may be made without departing from the scope and spirit of the invention as defined in the appended claims.

This is a continuation-in-part of my copending application, Serial No. 563,450 filed November 14, 1944 and now abandoned.

I claim:

1. A soluble, thermoplastic, solid copolymer of at least two copolymerizable materials, one of which is a dimethylstyrene selected from the group consisting of 2,4-dimethylstyrene, 2,5-dimethylstyrene, and 3,4-dimethylstyrene and another is an acyclic compound containing a single ethylenic double bond, each copolymerizable material being present in an amount equivalent to at least 10% of the total weight of all of said copolymerizable materials, said copolymer having an intrinsic viscosity of at least 0.1.

2. A soluble, thermoplastic, solid copolymer in accordance with claim 1 wherein said dimethylstyrene has a melting point range of no more than about 3° C. and an optical exaltation of at least one.

3. A soluble, thermoplastic, solid copolymer according to claim 1 in which said acyclic compound containing a single ethylenic double bond is acrylonitrile.

4. A soluble, thermoplastic, solid copolymer according to claim 1 in which said acyclic compound containing a single ethylenic double bond is an alkyl ester of an alpha, beta-unsaturated polycarboxylic acid.

5. A soluble, thermoplastic, solid copolymer according to claim 1 in which said acyclic compound containing a single ethylenic double bond is an alkyl ester of methacrylic acid.

6. A process which comprises maintaining at a temperature of from 20° C. to 200° C. a mixture of at least two copolymerizable materials, one of which is a dimethylstyrene selected from the group consisting of 2,4-dimethylstyrene, 2,5-dimethylstyrene, and 3,4-dimethylstyrene and another is an acyclic compound containing a single ethylenic double bond, each copolymerizable material being present in an amount equivalent to at least 10% of the total weight of all of said copolymerizable materials, until a copolymer having an intrinsic viscosity of at least 0.1 is obtained.

7. A process according to claim 6 in which said dimethylstyrene has a melting point range of no more than 3° C. and an optical exaltation of at least one.

8. A process according to claim 6 in which said mixture is in the form of a dispersion.

9. A process according to claim 6 in which said mixture is in the form of an emulsion.

EDWARD L. KROPA.

REFERENCES CITED

The following references are of record in the file of this patent:

UNITED STATES PATENTS

| Number | Name | Date |
| --- | --- | --- |
| 1,683,402 | Ostromislensky | Sept. 4, 1928 |
| 2,276,691 | Gibb | Mar. 17, 1942 |
| 2,383,921 | Soday | Aug. 28, 1945 |
| 2,390,437 | Hayes | Dec. 4, 1945 |

FOREIGN PATENTS

| Number | Country | Date |
| --- | --- | --- |
| 411,860 | Great Britain | June 13, 1934 |